(12) United States Patent
Sato

(10) Patent No.: US 8,902,256 B2
(45) Date of Patent: Dec. 2, 2014

(54) REPRODUCING APPARATUS WITH A FUNCTION FOR ENLARGING IMAGE DATA

(75) Inventor: Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 2169 days.

(21) Appl. No.: 11/185,654

(22) Filed: Jul. 20, 2005

(65) Prior Publication Data

US 2006/0028697 A1 Feb. 9, 2006

(30) Foreign Application Priority Data

Jul. 22, 2004 (JP) .................................. 2004-213788

(51) Int. Cl.
*G09G 5/00* (2006.01)
*H04N 1/04* (2006.01)
(Continued)

(52) U.S. Cl.
CPC .......... *H04N 5/23296* (2013.01); *G06T 7/2013* (2013.01); *G06T 7/2053* (2013.01);
(Continued)

(58) Field of Classification Search
CPC ............ H04N 5/23296; H04N 5/2621; H04N 5/2628; H04N 5/772; H04N 5/907; H04N 9/8047; H04N 7/181; G08B 13/19667; G06T 7/2013; G06T 7/2053
USPC .............. 375/240.08; 382/236; 345/660–661; 348/E5.055; 358/426.07, 471, 486; 386/E5.072
See application file for complete search history.

(56) References Cited

U.S. PATENT DOCUMENTS 5,311,177 A * 5/1994 Kimura et al. .................. 341/51
5,907,374 A * 5/1999 Liu .......................... 375/240.26
(Continued)

FOREIGN PATENT DOCUMENTS

JP 08-063605 A 3/1996
JP 11-018080 A 1/1999

OTHER PUBLICATIONS

The above references were cited in a Mar. 17, 2009 Japanese Office Action that issued in Japanese Patent Application No. 2004-213788.

*Primary Examiner* — Jin-Cheng Wang
(74) *Attorney, Agent, or Firm* — Cowan, Liebowitz & Latman, P.C.

(57) ABSTRACT

A reproducing apparatus includes: a reproducing portion for reproducing, from a recording medium, moving image data including plural frames whose information amount has been compressed by intraframe encoding; a memory for storing the moving image data reproduced by the reproducing portion; a decoding portion for reading out the frames of the moving image data stored in the memory and decoding the read-out data, the decoding portion reading out the moving image data in succession starting from an upper end of a screen for each frame to decode the read-out moving image data; an instruction portion for instructing enlargement of the moving image data; an enlarging area setting portion for setting, for each frame of the moving image data, a partial area on which enlarging processing is to be performed; a control portion for controlling the decoding portion in accordance with the enlarging instruction, the control portion stopping reading out the one frame of moving image data from the memory, which is performed by the decoding portion, in case that moving image data of the partial area in the one frame of the moving image data is decoded; and an output portion for modifying, in accordance with the number of pixels of the display device, the moving image data of the partial area decoded, and outputting the modified image data to the display device.

14 Claims, 5 Drawing Sheets

(51) Int. Cl.
*H04N 5/232* (2006.01)
*H04N 5/262* (2006.01)
*H04N 5/77* (2006.01)
*G06T 7/20* (2006.01)
*G08B 13/196* (2006.01)
*H04N 7/18* (2006.01)
*H04N 5/907* (2006.01)
*H04N 9/804* (2006.01)

(52) U.S. Cl.
CPC .......... *G08B 13/19667* (2013.01); *H04N 7/181* (2013.01); *H04N 5/2621* (2013.01); *H04N 5/2628* (2013.01); *H04N 5/772* (2013.01); *H04N 5/907* (2013.01); *H04N 9/8047* (2013.01)
USPC ............... 345/660; 348/E5.055; 348/E7.086; 358/426.07; 358/471; 358/486; 386/E5.072; 345/661

(56) References Cited

U.S. PATENT DOCUMENTS

| | | | |
|---|---|---|---|
| 6,636,222 B1* | 10/2003 | Valmiki et al. | 345/505 |
| 6,747,706 B1* | 6/2004 | Geddes et al. | 348/722 |
| 6,775,414 B1* | 8/2004 | Fogg et al. | 382/246 |
| 2002/0159646 A1* | 10/2002 | Haskell et al. | 382/243 |
| 2003/0051249 A1* | 3/2003 | Hoang | 725/95 |
| 2003/0142872 A1* | 7/2003 | Koyanagi | 382/236 |
| 2003/0161540 A1* | 8/2003 | Petrescu et al. | 382/236 |
| 2004/0008773 A1* | 1/2004 | Itokawa | 375/240.08 |
| 2004/0091052 A1* | 5/2004 | Youn et al. | 375/240.25 |
| 2005/0036553 A1* | 2/2005 | Hatti et al. | 375/240.25 |
| 2005/0207726 A1* | 9/2005 | Chen | 386/46 |

* cited by examiner

REPRODUCING APPARATUS WITH A FUNCTION FOR ENLARGING IMAGE DATA

BACKGROUND OF THE INVENTION

1. Field of the Invention

The present invention relates to a reproducing apparatus, and more specifically, enlarging processing performed when encoded image data is reproduced.

2. Related Background Art

Video cameras for picking up image data and recording the image data as digital signals on a magnetic tape, a memory card or the like to reproduce the image data have been around for some time. This type of apparatus records picked-up image data after encoding the image data by JPEG or other encoding methods.

Some video cameras have a function of enlarging, reducing or rotating reproduced image data to be displayed. For example, in enlarged display processing, image data reproduced from a recording medium is decoded and, a part of the decoded image data is extracted and enlarged to display a reproduced image enlarged.

In a known structure, decoded image data is stored in a memory and a part of the stored image data, corresponding to a designated area of the memory, is read out to be subjected to enlarging processing (see for example Japanese Patent Application Laid-open No. H09-44130 (corresponding U.S. Pat. No. 5,999,161)).

The structure disclosed in Japanese Patent Application Laid-open No. H09-44130 needs to decode all of reproduced image data and store in a memory in order to display an enlarged image.

This raises the frequency of access to the memory and, accordingly, the memory has to be accessible at high speed. The structure thus poses a problem by increasing cost and power consumption of the video camera or similar apparatus.

SUMMARY OF THE INVENTION

An object of the present invention is to solve the above-mentioned problem.

Another object of the present invention is to provide an apparatus that requires less frequent access to a memory and consumes less power during enlarging processing of encoded image data.

To achieve the above objects, according to one aspect of the present invention, a reproducing apparatus of the present invention comprises: reproducing means for reproducing, from a recording medium, moving image data including plural frames whose information amount has been compressed by intraframe encoding; a memory for storing the moving image data reproduced by the reproducing means; decoding means for read out the frames of the moving image data from the memory and decoding the read-out data, the decoding means reading out the moving image data in succession starting from an upper end of a screen for each frame to decode the read-out moving image data; instruction means for instructing to enlarge the moving image data; enlarging area setting means for setting, for each frame of the moving image data, a partial area on which enlarging processing is to be performed; control means for controlling the decoding means in accordance with the enlarging instruction given by the instruction means, the control means stopping reading out the one frame of moving image data from the memory, which is performed by the decoding means, in case that moving image data of the partial area in the one frame of the moving image data is decoded; and output means for modifying, in accordance with the number of pixels of the display device, the moving image data of the partial area decoded by the decoding means, and outputting the modified image data to the display device.

BRIEF DESCRIPTION OF THE DRAWINGS

Other objects and characteristics of the present invention than those mentioned above will become more apparent by the following detailed description of embodiments when read in conjunction with the accompanying drawings in which.

DESCRIPTION OF THE PREFERRED EMBODIMENTS

A detailed description will be given below on an embodiment of the present invention with reference to the accompanying drawings.

Figure 1:
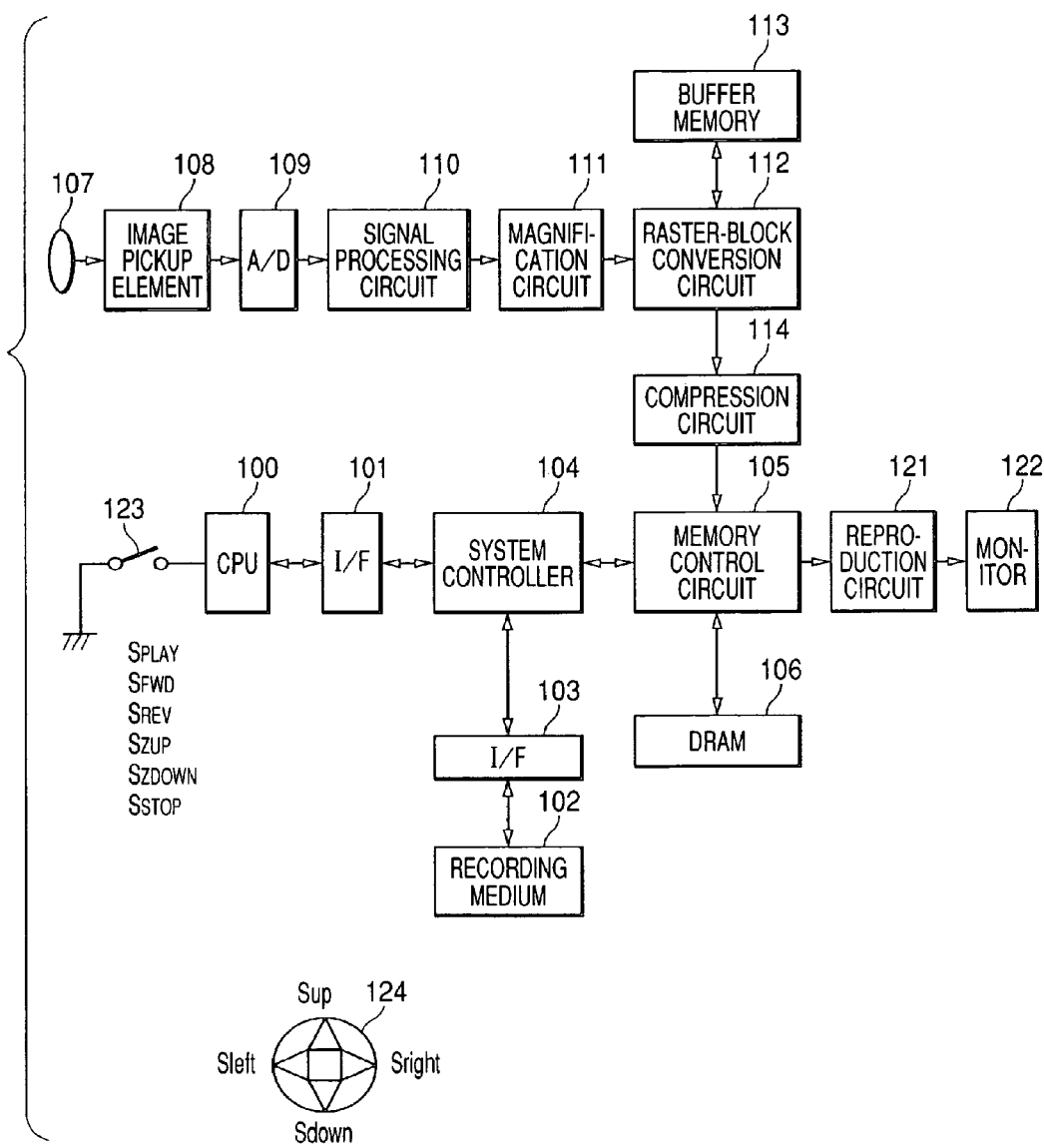
FIG. 1 is a block diagram showing the schematic structure of an embodiment of the present invention.

FIG. 1 is a block diagram showing the system structure of an image pickup apparatus according to this embodiment.

The image pickup apparatus of FIG. 1 is capable of picking up and recording moving image data that is made up of 30 frames of image data per second as well as reproducing a recorded moving image. The apparatus can take still pictures in addition to moving images.

A Central Processing Unit (CPU) 100 controls the entire image pickup apparatus. Denoted by 101 is an interface circuit (I/F) for the CPU 100, 102 denotes a recording medium such as a memory card, and 103 denotes an interface circuit (I/F) for the recording medium 102. Reference numeral 106 denotes a Dynamic Random Access Memory (DRAM) where image data, program and the like are stored. Reference numeral 104 denotes a system controller, which is engaged in sequential control, bus arbitration control, and the like. Reference numeral 107 denotes an image pickup lens, and 108 denotes an image pickup element composed of a one-chip Charge-Coupled Device (CCD).

Denoted by 109 is an A/D conversion circuit to convert an analog signal into a digital signal. Reference numeral 110 denotes a signal processing circuit and 111, a magnification circuit to reduce or enlarge image data in a horizontal or vertical direction through thinning-out processing, linear interpolation processing, or the like. Reference numeral 112 denotes a raster-block conversion circuit, which converts raster scan image data magnified by the magnification circuit 111 into block scan image data. Denoted by 113 is a buffer memory for raster-block conversion. The memory 113 is used to convert raster data into block scan data. Reference numeral 114 denotes a compression circuit, which employs JPEG to encode image data outputted block by block from the raster-block conversion circuit 112 and to thereby compress the amount of the data.

When a moving image is picked up, the raster-block conversion circuit 112 denotes frames of moving image data that are in raster scan order into an order of blocks having predetermined number of pixels in length and width, and outputs the converted data. The compression circuit 114 encodes, when a moving image is picked up, frames of image data outputted from the raster-block conversion circuit 112 by JPEG. JPEG is, as well known, an intraframe encoding method which encodes image data are using only image data in the same frame.

Figure 5:
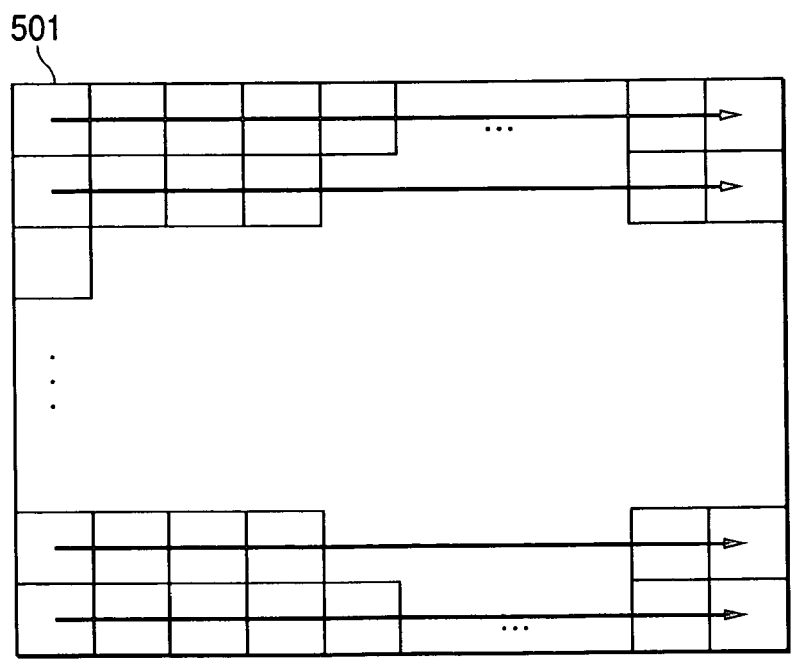
FIG. 5 is a diagram showing the order of reading image data from a memory in encoding and decoding processing.

The raster-block conversion circuit 112 at this point reads out frames of image data stored in the buffer memory 113 starting from a block 501, which is located at the upper left corner of the screen as shown in FIG. 5. The raster-block conversion circuit 112 next reads out the block to the right of the block 501 on the screen, and then continues on in this way until the rightmost block on the screen is reached. After the rightmost block is read out, blocks immediately below the current row of blocks are read out in a similar manner starting from the leftmost block.

A memory control circuit 105 transfers, during recording, by DMA transfer, image data outputted from the compression circuit 114 to the DRAM 106, and transfers image data stored in the DRAM 106 via the system controller 104 and the I/F 103 to the recording medium 102, where the transferred image is recorded. When image data is to be reproduced, the memory control circuit 105 reads out compressed image data from the recording medium 102, transfers, by DMA transfer, the read data to the DRAM 106 via the interface circuit 103 and the system controller 104, and transfers, by DMA transfer, the image data in the DRAM 106 to a reproduction circuit 121, which will be described later.

The CPU 100 uses a predetermined program to create decoded image data through software processing in which JPEG-encoded image data is decoded. The CPU 100 performs thinning-out processing and linear interpolation processing to reduce and enlarge, respectively, a decoded image.

The reproduction circuit 121 performs modulation, addition of synchronized signals, digital/analog conversion and the like on image data that is reproduced from the recording medium 102 and decoded, to thereby convert the reproduced and decoded data into a form suitable for display on a monitor 122.

The number of pixels of an image that can be outputted to and displayed on the liquid crystal monitor 122, which serves as a display unit, is smaller than the number of pixels of the image pickup element.

Denoted by 123 is an operation unit, which is composed of a switch SPLAY, a switch SFWD, a switch SREV, a switch SZUP, a switch SZDOWN, and a switch SSTOP. Denoted by 124 is a four-way operational key composed of a switch SUP, a switch SDOWN, a switch SRIGHT, and a switch SLEFT.

The functions of the switches of the operation unit 123 will be described. The switch SPLAY is a switch used to command that an image be played. When the switch SPLAY is turned on, an image recorded on the recording medium 102 is displayed on the liquid crystal monitor.

The switch SFWD is a switch for playing one still image ahead, and the switch SREV is a switch for playing one still image back.

The switch SZUP is a switch used to command the apparatus to enlarge an image being played, and the switch SZDOWN is a switch used to command the apparatus to reduce in size an image being played.

The switch SSTOP is a switch used to command the apparatus to pause a moving image that is being played. Each time the switch SSTOP is operated, one of an instruction to resume playing a moving image and an instruction to pause playing is outputted in an alternating manner.

The switch SUP, the switch SDOWN, the switch SRIGHT and the switch SLEFT correspond to the upper, lower, right and left portions of the four-way operational key 124, respectively. The four-way operational key 124 is, as will be described later, effective when a reproduced image is displayed enlarged. The switch SUP is a switch used to command the apparatus to scroll up over an enlarged image, the switch SDOWN is a switch used to command the apparatus to scroll down, the switch SRIGHT is a switch used to command the apparatus to scroll to the right, and the switch SLEFT is a switch used to command the apparatus to scroll to the left.

Figure 4A:
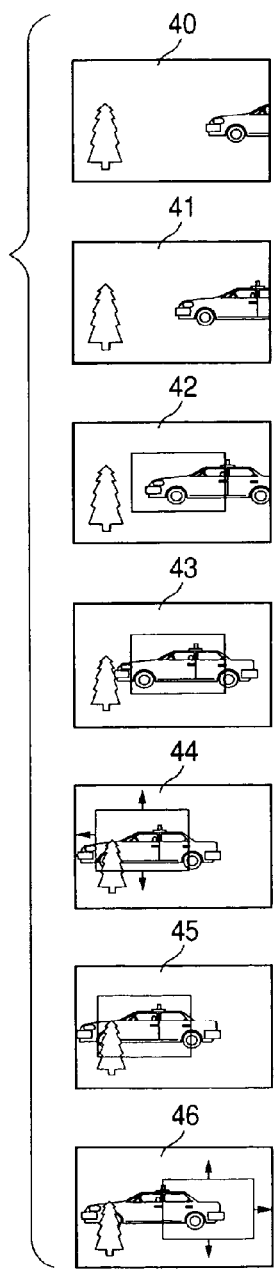
FIGS. 4A, 4B and 4C are diagrams showing display examples according to the embodiment.
Figure 4B:
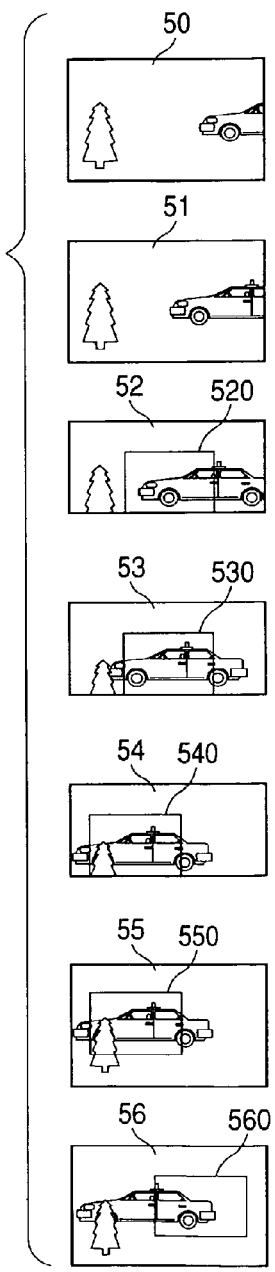
Figure 4C:
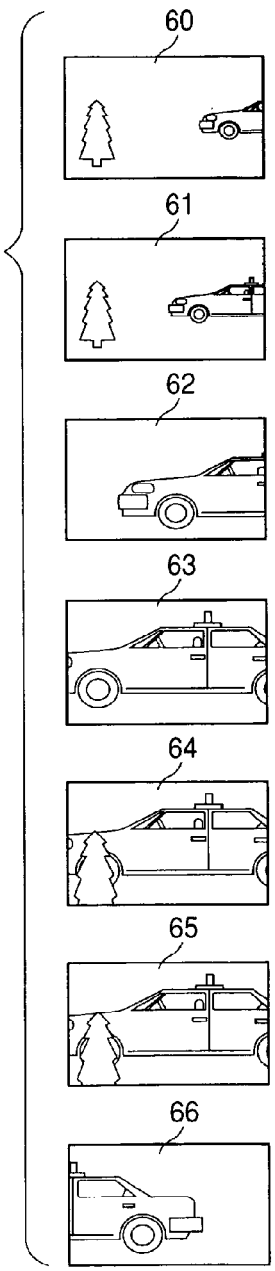

FIGS. 4A to 4C are diagrams showing a reproduced image and how the image is displayed on the monitor. FIG. 4A shows frames of a moving image before the image is enlarged and displayed. FIG. 4B shows areas of the moving image data of FIG. 4A that are decoded and stored in the DRAM 106 to extract and enlarge a part of each frame of the moving image data. FIG. 4C shows the screen of the monitor 112 which is displayed when the monitor 112 displays the moving image of FIG. 4A.

Figure 2:
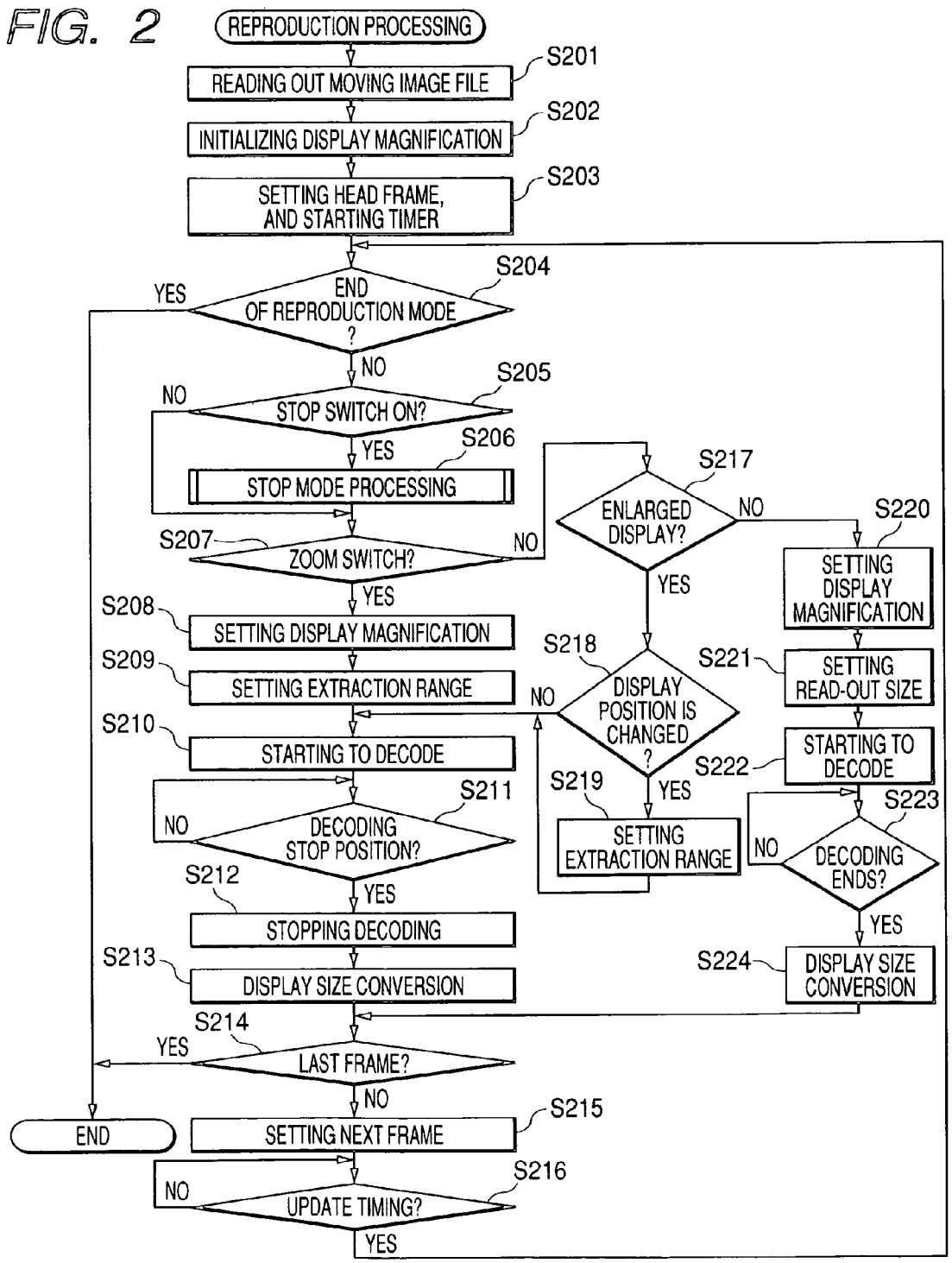
FIG. 2 is a flow chart showing the flow of displaying operation according to the embodiment.
Figure 3:
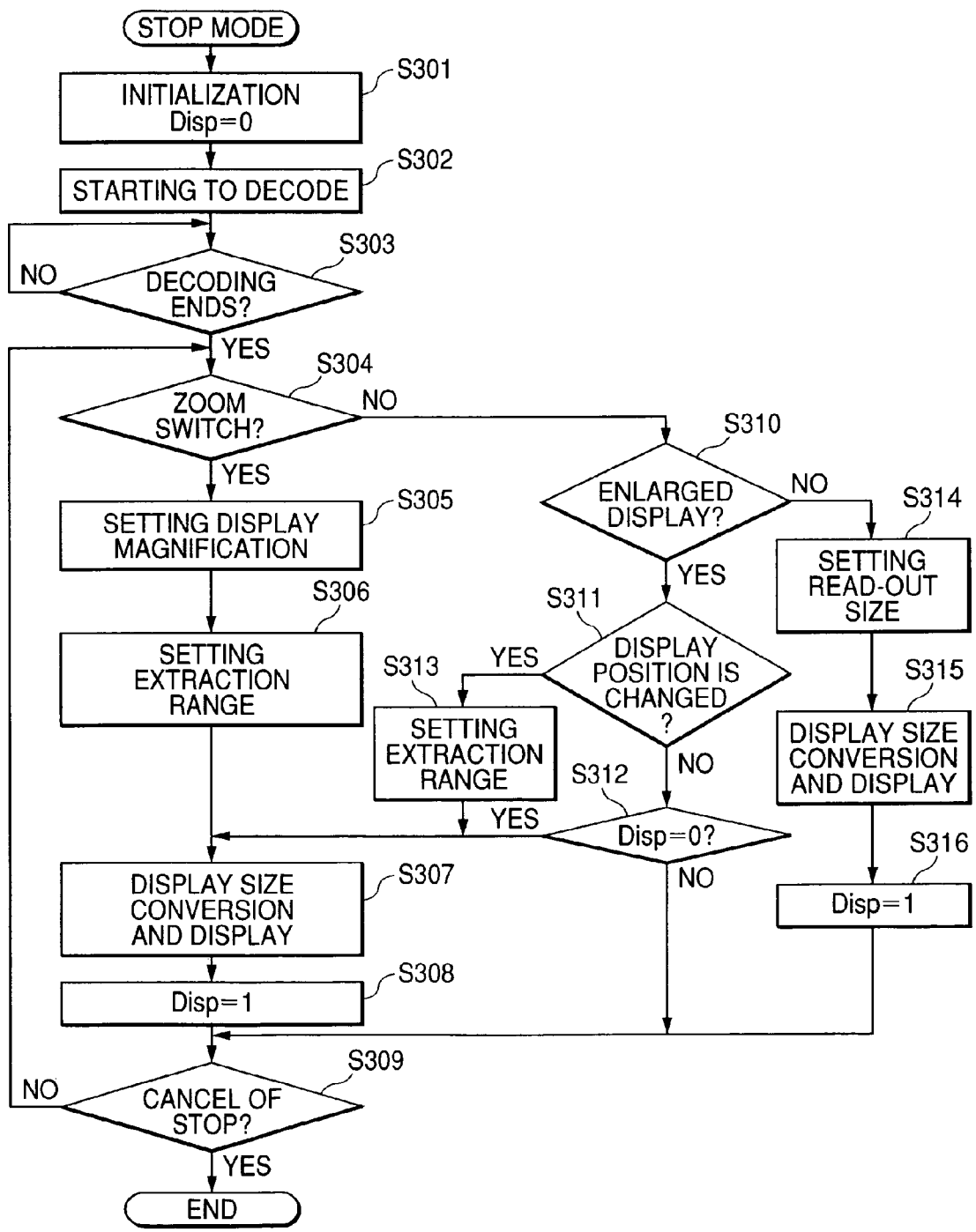
FIG. 3 is a detailed flow chart of a stop mode (S6)

Described next with reference to FIGS. 2 and 3 is processing for playing a moving image.

In this embodiment, a frame of moving image data before encoded has an aspect ratio of 4:3, and 1280 pixels (h)×960 (v). Such moving image data is reproduced from the recording medium 102 and is displayed on the monitor 122, which has a resolution of 640 pixels (h)×480 pixels (v). As has been described, each frame of moving image data is encoded by JPEG and, to reproduce the moving image data, data of a frame is decoded by JPEG separately from data of another frame.

The CPU 100 goes into a play mode when it is detected that the switch SPLAY has been turned on. In step S201, the CPU 100 controls the interface circuit 103 and the system controller 104 to start reading out a desired moving image file from of the recording medium 102. The image data read out from the recording medium 102 is transferred to and stored in the DRAM 106 in order.

In step S202, the display magnification is initialized and ×1 display magnification is set to display the whole image on the monitor 122.

In step S203, the CPU 100 sets a still image stored at the head of the moving image file, and starts a timer set in accordance with a desired frame rate.

In step S204, a state of the switch SPLAY is judged. When the switch SPLAY is off, the CPU 100 ends the play mode whereas the play mode is maintained and the CPU 100 moves to the next step when the switch SPLAY is on.

In step S205, a state of the switch SSTOP is judged. When the switch SSTOP is on, the CPU 100 pauses playing a moving image and moves to step S206. When the switch SSTOP is off, the moving image is kept played and the CPU 100 moves to the next step. Stop mode processing in step S206 will be described later.

In step S207, states of the zoom switches SZUP and SZDOWN, which are used to specify a display magnification, are judged. As a user operates either one of the zoom switches, the CPU 100 moves to step S208. In the case where neither of the switches SZUP and SZDOWN is operated, the CPU moves to step S217.

In step S217, whether the display magnification is ×1 magnification or not is judged. When an image is displayed enlarged, the CPU 100 moves to step S218, and to step S220 when the display magnification is ×1 magnification.

In step S220, the display magnification is set to ×1. In step S221, the original image size, namely, 1280 pixels (h)×960 pixels (v), is set as the size in which the image data is to be read out from the DRAM 106 in accordance with the display magnification set in step S220.

In step S222, the CPU 100 sequentially reads out, via the memory control circuit 105, from the DRAM 106, image data in the head frame of the moving image file set in step S203, and decodes the read image data. The decoded image data is sequentially written in the DRAM 106 block by block via the memory control circuit 105.

In step S223, whether decoding processing has been completed for one frame of image data or not is checked. In the case where decoding processing for one frame of image data has been completed, the CPU 100 moves to step S224.

In step S224, the CPU 100 changes the resolution of decoded image data from the original image size to the resolution of the monitor 122.

Specifically, the CPU 100 reads out stored image data from the DRAM 106 via the memory control circuit 105 and converts the resolution of the image data. When the display magnification is ×1, the original image size, 1280 pixels (h)×960 pixels (v), is reduced by ½ in width and by ½ in height. The converted image data is sequentially written in a display area in the DRAM 106. Thus 640 pixels (h)×480 pixels (v) image data for display is stored in the DRAM 106. The stored image data is displayed as shown in screens 60 and 61 of FIG. 4C.

In step S214, whether the frame that is currently displayed is the last frame of the moving image data or not is judged. In the case where it is the last frame, the moving image play mode is ended. In the case where it is not the last frame, the CPU 100 moves to step S215.

In step S215, which frame is to receive reproduction processing next is set.

In step S216, the timer set in step S203 is checked to determine whether a predetermined period of time has passed or not. In the case where the predetermined time has passed, the CPU 100 proceeds to processing the next frame of the image data.

Subsequently, steps S204 to S216 are repeated.

Described next is the operation of displaying a moving image that is being played enlarged. A user operates the switch SZUP for enlarged display while a moving image is being played at ×1 magnification. Then the CPU 100 judges in step S207 that the switch SZUP has been operated, and moves to step S208.

In step S208, a larger magnification is set each time the user operates the switch SZUP (to ×2 at one flick of the switch SZUP, ×4 at the next flick) whereas a smaller magnification is set each time the user operates the switch SZDOWN (to ×2 at one flick of the switch SZDOWN, ×1 at the next flick). In this embodiment, the display magnification is changed to ×2 by operating the switch SZUP while a moving image is being displayed at ×1 magnification.

In this embodiment, an area of the original image is extracted in accordance with the enlarging magnification, and the extracted portion of image data is subjected to enlarging processing in accordance with the number of pixels of the monitor 122.

In step S209, the size of the area to be extracted is obtained from the original image size and the magnification set in step S208, to set a range to be extracted for enlarged display on the original screen.

For instance, when the display magnification set in step S208 is ×2, the size of the extracted area is set to 640 pixels (h)×960 pixels (v) by multiplying 1280 pixels×960 pixels by ½ in width and length, respectively. Similarly, the display magnification set in step S208 is ×4, the size of the extracted area is set to 320 pixels (h)×240 pixels (v) by multiplying the original image size by ¼ in width and length, respectively. Here, the display magnification set in step S208 is 2.

In step S210, the CPU 100 reads out one frame of stored image data from the DRAM 106 via the memory control circuit 105, and decodes the read-out image data block by block. At this point, the CPU 100 sequentially reads out one frame of image data stored in the DRAM 106 starting from a block at the upper left corner of the screen as shown in FIG. 5, and decodes the read-out image data. The decoded image data is sequentially transferred to and stored in the DRAM 106 via the memory control circuit 105.

After decoding processing is started in order from the upper left corner block on the screen in this way, the CPU 100 compares in step S211 the position on the screen of the decoded image data against the extraction range set in step S209. The CPU 100 continues the processing of reading out encoded image data from the DRAM 106 and the processing of decoding the read-out image data until the position of the decoded image data exceeds the extraction range. When it is judged that the extraction range is exceeded, the CPU 100 moves to step S212.

In step S212, the processing of decoding encoded image data is stopped. As a result, the DRAM 106 now stores image data of the range shown in 52 of FIG. 4B in a decoded state whereas image data of an area below this range on the screen remains encoded. In FIG. 4B, 520 indicates the extraction range set in step S209.

In step S213, the CPU 100 converts the resolution of the image data in the extracted area set in step S209 into the resolution of the monitor 122.

In other words, the CPU 100 has the memory control circuit 105 read out image data of an extraction area, specifically, image data in the extraction range 520 of FIG. 4B, from the DRAM 106, and converts the resolution of the read image data into the resolution of the monitor 122 in accordance with a set display magnification.

For instance, when the display magnification is ×4, image data of 320 pixels (h)×240 pixels (v) extraction area is doubled in the horizontal direction and the vertical direction each. When the display magnification is ×2, there is no need to convert the resolution and the image data is displayed as it is since the size of the extraction range is 640 pixels (h)×480 pixels (v).

The image data with the resolution thus converted is written in a display memory area of the DRAM 106 in order. In this way, enlarged image data having 640 pixels (h)×480 pixels (v) is stored in the display memory area of the DRAM 106, and the stored image data is displayed as a×2 magnification image on the monitor as shown in a screen 62 of FIG. 4C.

Subsequently, steps S214 to S207 are repeated to set the next frame.

In the case where the switches SZUP and SZDOWN are found to be off in step S207, the CPU 100 moves to step S217.

In step S217, the display magnification is checked to judge whether it is ×1 magnification or not. When the display magnification is judged to be larger than ×1 magnification, the CPU 100 moves to step S218. When the display magnification is judged as ×1 magnification, the CPU 100 moves to step S220.

In step S218, the CPU 100 judges states of the switches SUP, SDOWN, SRIGHT and SLEFT of the four-way operational key 124. When the user operates any one of the four switches to instruct the apparatus to change the display position, the CPU 100 moves to step S219. When none of the switches SUP, SDOWN, SRIGHT and SLEFT is operated, the CPU 100 moves to step S210. In the case where the four-way operational key is not operated while the screen 62 of FIG. 4C is displayed, a screen 63 is displayed without changing the current display range.

Subsequently, steps S210 to 218 are repeated to display the continuous frames 62 and 63 of a moving image enlarged.

On the other hand, when the user operates the four-way operational key 124 to change the display position while a moving image is being played enlarged, the CPU 100 checks the states of the switches SUP, SDOWN, SRIGHT and SLEFT and moves to step S219. In step S219, the CPU 100 sets a new area to be extracted for enlarged display in a direction that is designated via the switches.

For example, in the case where the switch SLEFT is operated while a screen 53 of FIG. 4B is displayed, the extraction range is moved to the left of the range 530 to set a new extraction range 540. As a result, the display screen of the monitor 122 is switched to a screen 64 of FIG. 4C.

Subsequently, steps S210 to S213 are repeated.

Pausing processing will be described next.

The user operates the switch SSTOP in step S205 to pause a moving image that is being played enlarged. This causes the CPU 100 to move into a stop mode where playing of a moving image is paused. FIG. 3 is a flow chart showing processing of the stop mode in step S206.

In step S301, the CPU 100 initializes display settings and sets a parameter Disp to 0. In step S302, the CPU 100 reads out one frame of image data stored in the DRAM 106 via the memory control circuit 105, and decodes the read-out image data in order. The decoded image data is sequentially transferred to and stored in the DRAM 106 via the memory control circuit 105.

In step S303, completion of decoding one frame of image data is waited. Image data stored at this point in the DRAM 106 is as shown in a screen 55 of FIG. 4B. In other words, when instructed to pause playing, the CPU 100 decodes all of image data of one frame, including an area of image data below the extraction range 550 for enlarged display, and stores the decoded image data in the DRAM 106.

When decoding one frame of image data is completed, the CPU 100 judges in step S304 states the zoom switches SZUP and SZDOWN, which are used to specify a display magnification.

In the case where the user operates either one of the zoom switches, the CPU 100 moves to step S305. In the case where the user operates neither the switch SZUP nor the switch SZDOWN, the CPU 100 moves to step S310.

In step S310, the state of the display magnification is judged. When the display magnification is judged to be larger than ×1 magnification, the CPU 100 moves to step S311. When the display magnification is judged as ×1 magnification, the CPU 100 moves to step S314.

In step S311, the CPU 100 judges the states of the switches SUP, SDOWN, SRIGHT and SLEFT of the four-way operational key 124. When the user operates any one of the four switches to instruct the apparatus to shift the display range, the CPU 100 moves to step S313. When none of the switches SUP, SDOWN, SRIGHT and SLEFT is operated, the CPU 100 moves to step S312.

In step S312, the value of the variable Disp is checked. When it is judged that a still image is being displayed at a pause command (Disp=1), the CPU 100 moves to step S309. On the other hand, when it is judged that a moving image, not a still image, is being displayed (Disp=0), the CPU 100 moves to step S307.

In step S307, the CPU 100 converts the resolution of image data in the extraction range that is stored in the DRAM 106, in accordance with the resolution of the monitor 122.

In other words, of image data stored in the DRAM 106, the CPU 100 reads image data in the extraction range and converts the resolution of the read image data in accordance with a set display magnification. For instance, when the display magnification is ×4, 320 pixels (h)×240 pixels (v) extraction range image data is doubled in the horizontal direction and the vertical direction each. When the display magnification is ×2, the 640 pixels (h)×480 pixels (v) extraction range image data is outputted as it is.

The converted data is written in a display memory area of the DRAM 106 in order. Thus 640 pixels (h)×480 pixels (v) image data is stored in the display memory area of the DRAM 106. While the pause playing command is effective, the one frame of moving image data stored in the display memory area is repeatedly read out and outputted to the monitor 122, to thereby display an enlarged image as a still image as shown in a screen 65 of FIG. 4C.

In step S308, the parameter Disp indicating whether a moving image or a still image is being displayed is set to 1.

In the case where the user operates the switch SSTOP in step S309 in order to cancel the pause command while playing is paused, the CPU 100 ends the stop mode to resume playing a moving image in response. When the SSTOP is off, the CPU 100 moves to step S304.

When it is judged in step S310 that the display magnification is ×1 magnification, the original image size, namely, 1280 pixels (h)×960 pixels (v), is set in step S314 as a size in which image data is read out from the DRAM 106.

In step S315, the CPU 100 converts the resolution of the decoded image data from the original image size to the resolution of the monitor 122. Then the CPU 100 sets the parameter Disp to 1 and moves to step S309.

In the case where an instruction made by the user to change the display position is detected by detecting in step S311 that any one of the switches SUP, SDOWN, SRIGHT and SLEFT of the four-way operational key 124 has been operated, the CPU 100 moves to step S313.

In step S313, the CPU 100 sets moves the extraction range in a direction designated through the four-way operational key 124. Specifically, in the case where the switch SRIGHT is operated while the screen 65 of FIG. 4C is displayed, the extraction range is changed from 550 of FIG. 4B to 560, with the result that a screen 66 of FIG. 4C is displayed on the monitor 122. During the change, the monitor 122 keeps displaying a still image.

As has been described, according to this embodiment, one frame of encoded image data stored in the DRAM 106 is read out and decoded sequentially starting from an upper end of the screen in response to an enlargement command given while a moving image is played. As image data in an extraction range necessary in enlarged display is decoded, processing of reading out encoded image data from the DRAM 106 is ended, and decoding processing on this frame is stopped to proceed to processing of the next frame.

In this way, there is no need to read out a portion of encoded image data that is unnecessary for enlarged display, from the DRAM 106, and to process decoding on this portion. Accordingly, the DRAM is accessed less frequently and the load of the CPU is thus lightened.

In addition, an enlarged play function can be obtained without increasing the load of the CPU even when the number of pixels per frame is increased, and at the same time, the power consumption can be reduced. Another technological advantage of this embodiment is improved ease of use in pausing an enlarged moving image since the display position can be moved as processing of expanding a still image is completed.

The above embodiment describes a case of playing a moving image, but similar processing can be performed when a still image is to be played.

The expansion processing and magnification processing of a still image, which are performed by the CPU in the above-described example, may be carried out by hardware.

The object of the present invention can also be achieved by providing a storage medium storing program codes for performing the aforesaid processes to a reproduction apparatus, reading out the program codes, by a CPU or MPU of the reproduction apparatus, from the storage medium, then executing the program.

In this case, the program codes read out from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read out by a CPU from the reproduction apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the reproduction apparatus or in a memory provided in a function expansion unit which is connected to the reproduction apparatus, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart of FIGS. 2 and 3 described in the embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application No. 2004-213788 filed Jul. 22, 2004, which is hereby incorporated by reference herein.

What is claimed is:

1. A reproducing apparatus comprising:
   reproducing unit configured to sequentially reproduce, from a recording medium, encoded moving image data of plural frames;
   a memory configured to store the encoded moving image data of each frame of the plural frames sequentially reproduced by the reproducing unit;
   instruction unit configured to provide instructions for enlargement and reproduction of the moving image data by selectively controlling the extent of the encoded moving image data to be decoded in the encoded moving image data of the each frame stored in the memory during decoding of the encoded image data; and
   a control processor comprising:
   decoding unit configured to read-out the encoded moving image data of the each frame from the memory and decode the encoded moving image data of the each frame read out from the memory;
   enlarging area setting unit configured to set, in the each frame of the encoded moving image data stored in the memory to be decoded by the decoding unit, an area to be subjected to the enlargement instructed by the instruction unit;
   control unit configured to control the decoding unit in accordance with the enlarging instruction given by the instruction unit such that
   when there is no enlargement instruction provided by the instruction unit, the control unit controls the decoding unit so as to decode all the encoded moving image data of the each frame read out sequentially from the memory from the top of the each frame to the bottom thereof and controls an output unit so as to output all the decoded image data of the each frame to a display device,
      if the enlargement instruction is provided by the instruction unit, the control unit controls the decoding unit so as to read out sequentially the encoded moving image data of the each frame from the memory from the top of the each frame up to the encoded image data which includes therein but does not go beyond the area set by the enlarging area setting unit and decode the thus read-out encoded moving image data, and controls the output unit so as to output only the decoded image data in the area set in the each frame by the enlarging area setting unit from the image data decoded by the decoding unit to the display device, and
      if a pause instruction is provided by the instruction unit during the enlargement instructed by the instruction unit, the control unit stops the reproducing unit from reproducing the encoded moving image data from the recording medium, controls the decoding unit so as to read out sequentially all the encoded image data of the each frame from the memory from the top of the each frame to the bottom thereof and decode the thus read-out encoded moving image data, and controls the output unit so as to output only the decoded image data of the area set in the each frame by the enlarging area setting unit from the image data decoded by the decoding unit to the display device, and
   wherein the instruction unit is arranged, by a user operation, to provide an instruction to shift the set area of the image data of the one frame during the enlargement and the pause instructed by the instruction unit, and
   wherein the enlarging area setting unit determines the set area in accordance with a direction of in which the display area is instructed to be moved by the instruction unit.

2. An apparatus according to claim 1,
   wherein the instruction unit is arranged to provide an instruction of an enlargement ratio, and
   wherein the enlarging area setting unit determines the set area in accordance with the enlargement ratio instructed by the instruction unit and the number of pixels of the display device.

3. An apparatus according to claim 1,
   wherein, in case that the decoding unit decodes the image data of the set area of the frame read out sequentially from the memory, the control unit stops reading out the encoded image data of the frame from the memory and starts reading out the next frame.

4. An apparatus according to claim 1,
   wherein the moving image data is encoded on a unit basis of a block including a predetermined number of pixels, and wherein the enlarging area setting unit determines the set area on the block basis.

5. An apparatus according to claim 1, wherein the output unit includes storing unit configured to store the decoded moving image data and, in response to the pause instruction, repeatedly reads out image data in the set area of the same frame from the storing means to modify the read-out data and output the modified data to the display device.

6. An apparatus according to claim 1, wherein, when the size of the set area is smaller than the number of pixels of the display device, the output unit subjects the image data in the set area to enlarging processing to output the image data of the set area to the display device.

7. A method of controlling a reproducing apparatus including a recording medium on which encoded moving image data of a plurality of frames is recorded and a memory, comprising:
   a reproducing step of sequentially reproducing, from the recording medium, the encoded moving image data of plural frames and controlling the memory to store therein the encoded moving image data of each of frame of the plural frames sequentially reproduced in the reproducing step;
   an instruction step of providing instructions for enlargement and reproduction of the moving image data by selectively controlling the extent of the encoded moving image data to be decoded in the encoded moving image data of the each frame stored in the memory during decoding of the encoded image data;
   a control processing step including:
   a decoding step of controlling the memory to read out therefrom the moving image data of the each frame and decoding the encoded moving image data of the each frame of the each frame read-out from the memory;
   an enlarging area setting step of setting, in each frame of the encoded moving image data stored in the memory to be decoded in the decoding step, an area to be subjected to the enlargement instructed by the instruction unit;
   a control step of controlling of the decoding step in accordance with the enlarging instruction given in the instruction step such that
      when there is no enlargement instruction provided in the instruction step, the control step controls the decoding step so as to decode all the encoded image data of the each frame read out sequentially from the memory from the top of the each frame to the bottom thereof and controls an output step so as to output all the decoded image data of the each frame to a display device,
      if the enlargement instruction is provided in the instruction step, the control step controls the decoding step so as to read out sequentially the encoded image data of the each frame read out sequentially from the memory from the top of the frame up to the encoded image data which includes therein but does not go beyond the area set in the enlarging area setting step and decode the thus read-out encoded moving image data, and controls the output step so as to output only the decoded image data in of the area set in the each frame in the enlarging area setting step from the image data decoded in the decoding step to the display device, and
      if a pause instruction is provided in the instruction step during the enlargement instructed in the instruction step, the control step stops the reproducing step from reproducing the encoded moving image data from the recording medium, controls the decoding step so as to read out sequentially all the encoded moving image data of the each frame from the memory from the top of the each frame to the bottom thereof and decode the thus read-out encoded moving image data, and controls the output step so as to output only the decoded image data of the area set in the each frame in the enlarging area setting step from the image data decoded in the decoding step to the display device, and
   wherein the instruction step includes providing an instruction of an enlargement ratio, and
   wherein the enlarging area setting step determines the area in accordance with the enlargement ratio instructed in the instruction step and the number of pixels of the display device.

8. A method according to claim 7,
wherein the instruction step includes providing an instruction of an enlargement ratio, and
wherein the enlarging area setting step determines the area in accordance with the enlargement ratio instructed in the instruction step and the number of pixels of the display device.

9. A method according to claim 7,
wherein, in case that the decoding step decodes the image data of the set area of the frame of moving image data read out from the memory, the control step stops reading out the image data of the frame from the memory and starting reading the next frame.

10. A method according to claim 7,
wherein the moving image data is encoded on a unit basis of a block including a predetermined number of pixels, and
wherein the enlarging area setting step determines the set area on the block basis.

11. A method according to claim 7, wherein the output step includes storing the decoded moving image data and, in response to the pause instruction, repeatedly reads out image data in the set area of the same frame from the memory to modify the read-out data, and outputs the modified data to the display device.

12. A method according to claim 7, wherein, when the size of the set area is smaller than the number of pixels of the display device, the output step subjects the image data in the set area to enlarging processing to output the image data of the set area to the display device.

13. A non-transitory computer-readable recording medium storing a program code for causing a reproducing apparatus to execute any the reproducing method set out in any one of claims 7 to 9, 10, and 11 to 12.

14. A reproducing apparatus comprising:
   reproducing unit configured to reproduce, from a recording medium, encoded moving image data of plural frames;
   a memory configured to store the encoded moving image data of each frame of the plural frames reproduced by the reproducing unit;
   instruction unit configured to provide instructions for enlargement and reproduction of the moving image data by selectively controlling the extent of the encoded moving image data to be decoded in the encoded moving image data of the each frame stored in the memory during decoding of the encoded image data; and
   a control processor comprising:
   decoding unit configured to read-out the encoded moving image data of the each frame from the memory and decode the encoded moving image data of the each frame read out from the memory;

enlarging area setting unit configured to set, in the each frame of the encoded moving image data stored in the memory to be decoded by the decoding unit, an area to be subjected to the enlargement instructed by the instruction unit;

control unit configured to control the decoding unit in accordance with the enlarging instruction given by the instruction unit such that when there is no enlargement instruction provided by the instruction unit, the control unit controls the decoding unit so as to decode all the encoded moving image data of the each frame read out from the memory and controls an output unit so as to output all the decoded image data of the each frame to a display device, if the enlargement instruction is provided by the instruction unit, the control unit controls the decoding unit so as to read out the encoded moving image data which includes the area set by the enlarging area setting unit of the each frame from the memory and decode the thus read-out encoded moving image data, and controls the output unit so as to output the decoded image data in the area set in the each frame by the enlarging area setting unit from the image data decoded by the decoding unit to the display device, and if a pause instruction is provided by the instruction unit during the enlargement instructed by the instruction unit, the control unit stops the reproducing unit from reproducing the encoded moving image data from the recording medium, controls the decoding unit so as to read out all the encoded image data of the each frame from the memory and decode the thus read-out encoded moving image data, and controls the output unit so as to output only the decoded image data of the area set in the each frame by the enlarging area setting unit from the image data decoded by the decoding unit to the display device, and wherein the instruction unit is arranged, by a user operation, to provide an instruction to shift the set area of the image data of the one frame during the enlargement and the pause instructed by the instruction unit, and wherein the enlarging area setting unit determines the set area in accordance with a direction in which the display area is instructed to be moved by the instruction unit.

* * * * *